United States Patent
Wei et al.

(10) Patent No.: US 10,312,792 B2
(45) Date of Patent: Jun. 4, 2019

(54) PROJECTION APPARATUS, POWER MANAGEMENT APPARATUS, AND METHOD FOR POWER MANAGEMENT THEREOF

(71) Applicant: Coretronic Corporation, Hsin-Chu (TW)

(72) Inventors: Kuo-Huan Wei, Hsin-Chu (TW); Chih-Chung Yang, Hsin-Chu (TW); Yung-Chuan Tseng, Hsin-Chu (TW); Wen-Chen Chen, Hsin-Chu (TW); Jui-Ming Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 386 days.

(21) Appl. No.: 15/391,848

(22) Filed: Dec. 28, 2016

(65) Prior Publication Data
US 2017/0194851 A1 Jul. 6, 2017

(30) Foreign Application Priority Data
Dec. 31, 2015 (CN) .......................... 2015 1 1027378

(51) Int. Cl.
*H02H 7/00* (2006.01)
*H02M 1/10* (2006.01)

(52) U.S. Cl.
CPC .................................... *H02M 1/10* (2013.01)

(58) Field of Classification Search
USPC ........ 361/18, 86, 88, 90; 307/19, 20, 23, 24, 307/28, 86
See application file for complete search history.

(56) References Cited

U.S. PATENT DOCUMENTS 4,053,788 A * 10/1977 Robie ................... G03G 15/80
307/11
4,957,831 A * 9/1990 Meredith ............. H01H 9/0011
307/150

(Continued)

FOREIGN PATENT DOCUMENTS

CN 1469209 1/2004
CN 1501755 6/2004

(Continued)

OTHER PUBLICATIONS

"Office Action of China Counterpart Application," dated Dec. 3, 2018, p. 1-p. 15.

*Primary Examiner* — Ronald W Leja
(74) *Attorney, Agent, or Firm* — JCIPRNET (57) ABSTRACT

A projection apparatus, a power management apparatus, and a method for power management thereof are provided. The projection apparatus has a first power socket corresponding to a first power specification and a second power socket corresponding to a second power specification. The second power specification is different from the first power specification. A voltage detection unit is adapted to detect an input voltage received by a powered power socket, wherein the powered power socket is the first power socket or the second power socket. A control unit decides whether the input voltage detected by the voltage detection unit is matched up with the power specification of the corresponding powered power socket to determine an operation mode of the projection apparatus and to determine whether the projection apparatus provides an alarm message to ensure safety of use.

27 Claims, 9 Drawing Sheets

(56) References Cited

U.S. PATENT DOCUMENTS

| | | | | |
|---|---|---|---|---|
| 6,330,144 | B1* | 12/2001 | Lee | H01R 13/652 |
| | | | | 361/115 |
| 6,974,342 | B2* | 12/2005 | Thomas | H01R 13/64 |
| | | | | 439/222 |
| 2005/0073199 | A1* | 4/2005 | Jenkin | H02J 3/005 |
| | | | | 307/38 |
| 2006/0114631 | A1* | 6/2006 | Li | G01R 31/319 |
| | | | | 361/90 |
| 2009/0309746 | A1* | 12/2009 | Chen | G06F 1/30 |
| | | | | 340/654 |
| 2010/0117453 | A1* | 5/2010 | Langgood | H01R 13/447 |
| | | | | 307/75 |
| 2012/0206698 | A1* | 8/2012 | Hino | G03B 21/2026 |
| | | | | 353/85 |
| 2015/0371525 | A1* | 12/2015 | Chen | G08B 21/185 |
| | | | | 340/649 |
| 2017/0194851 | A1* | 7/2017 | Wei | H02M 1/10 |

FOREIGN PATENT DOCUMENTS

| | | |
|---|---|---|
| CN | 2737047 | 10/2005 |
| CN | 1780081 | 5/2006 |
| CN | 101102043 | 1/2008 |
| CN | 101174156 | 5/2008 |
| CN | 101330201 | 12/2008 |
| CN | 101330790 | 12/2008 |
| CN | 201226232 | 4/2009 |
| CN | 201297596 | 8/2009 |
| CN | 201797138 | 4/2011 |
| CN | 102197543 | 9/2011 |
| CN | 102636942 | 8/2012 |
| CN | 103259325 | 8/2013 |
| CN | 104009351 | 8/2014 |
| CN | 204313327 | 5/2015 |
| TW | 542494 | 7/2003 |

* cited by examiner

PROJECTION APPARATUS, POWER MANAGEMENT APPARATUS, AND METHOD FOR POWER MANAGEMENT THEREOF

CROSS-REFERENCE TO RELATED APPLICATION

This application claims the priority benefits of China patent application no. 201511027378.1, filed on Dec. 31, 2015. The entirety of the above-mentioned patent application is hereby incorporated by reference herein and made a part of this specification.

BACKGROUND OF THE INVENTION

1. Field of the Invention

The invention relates to a display device, and relates particularly to a projection apparatus, a power management apparatus, and a method for power management thereof.

2. Description of Related Art

Typically, the power specification, power socket, power plug and such of an electronic device differs according to a user's country. The commonly used 110V voltage differs from the 220V voltage which is used in most countries in Europe. A problem arises, the household electrical wiring are configured mainly for the low voltage power in a country where a low voltage power is generally used, and only in a location with special need (for example, a location for installing air conditioning) is there accommodations for a high voltage power.

Along with advances in technology, a projection apparatus is widely used in different locations and occasions to satisfy various needs of businesses, education and even home entertainment. A high end projection apparatus requires an input voltage set at a high voltage input of 220-240V due to the major increase in machine power consumption stemming from developments of increased brightness and increasingly complex functions. However, the customer is required to additionally setup a power supply to provide the projection apparatus to use if the projection apparatus only uses high voltage power. In this case, the eagerness to purchase is reduced and the sales competitiveness of the product is lowered as well.

In addition, the projection apparatus needs to accommodate different shipping specifications of different sales regions, and therefore causes a complexity in a production line such that manufacturing costs are increased. Furthermore, mistakes in material arrangements are caused by the negligence of an operator such that dangers regarding the safety of the product arise.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection apparatus, a power management apparatus, and a method for power management thereof corresponding to input voltages of different power specifications such that a projector apparatus is able to operate in different modes, increase the convenience of using the projection apparatus and satisfy voltage safety standards of a user's region, and ensure the safety of using the projection apparatus.

The invention provides a projection apparatus, including a first power socket, a second power socket, and a power management apparatus. The first power socket corresponds to a first power specification. The second power socket corresponds to a second power specification. The second power specification is different from the first power specification. The power management apparatus is coupled to the first power socket and the second power socket. The power management apparatus includes a voltage detection unit and a control unit. The voltage detection unit is adapted to detect an input voltage received by a powered power socket. The powered power socket is the first power socket or the second power socket. The control unit is coupled to the voltage detection unit, and decides an operation mode of the projection apparatus and decides whether an alarm message is provided by the projection apparatus according to whether the input voltage detected by the voltage detection unit is matched up with a power specification corresponding to the powered power socket.

The invention provides a power management apparatus adapted for managing a projection apparatus. The projection apparatus has a first power socket corresponding to a first power specification and a second power socket corresponding to a second power specification, and the second power specification is different from the first power specification. The power management apparatus includes a voltage detection unit and a control unit. The voltage detection unit is adapted to detect an input voltage received by a powered power socket. The powered power socket is the first power socket or the second power socket. The control unit is coupled to the voltage detection unit, and decides an operation mode of the projection apparatus and decides whether an alarm message is provided by the projection apparatus according to whether the input voltage detected by the voltage detection unit is matched up with a power specification corresponding to the powered power socket.

The invention provides a method for power management adapted for a projection apparatus. The projection apparatus has a first power socket corresponding to a first power specification and a second power socket corresponding to a second power specification. The second power specification is different from the first power specification. The method for power management includes the following steps: a voltage detection unit is provided, and the voltage detection unit detects an input voltage received by a powered power socket, wherein the powered power socket is the first power socket or the second power socket; a control unit is provided, and the control unit decides an operation mode of the projection apparatus and decides whether an alarm message is provided by the projection apparatus according to whether the input voltage detected by the voltage detection unit is matched up with a power specification corresponding to the powered power socket.

According to the above, an embodiment of the invention detects input voltages received by different power sockets through a voltage detection unit and determines whether the input voltage is matched up/compatible with the power specification corresponding to the powered power socket (the power socket which receives power) through a control unit to decide an operation mode of a projection apparatus and whether the projection apparatus provides an alarm message. In this way, the projection apparatus may use voltages of different specifications, therefore the convenience of using the projection apparatus is increased, mistakes in material arrangements are reduced, whether the power is mistakenly plugged by the user is suitably notified, and the safety of using the projection apparatus is increased. In addition, in some embodiments, a location where a cover is covered may be detected through a cover position detection unit. In addition, whether the input voltage received by the powered power socket is matched up/compatible with the power specification corresponding to the power socket may be determined according to two detection results, namely the input voltage and the location where the cover is covered. In this way, a situation where the wrong power is plugged in error may be prevented, and the safety of using the projection apparatus is further increased.

Several exemplary embodiments accompanied with figures are described in detail below to further describe the disclosure in details.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Reference will now be made in detail to the embodiments of the invention, examples of which are illustrated in the accompanying drawings. Wherever possible, the same reference numbers are used in the drawings and the description to refer to the same or like parts.

Figure 1:
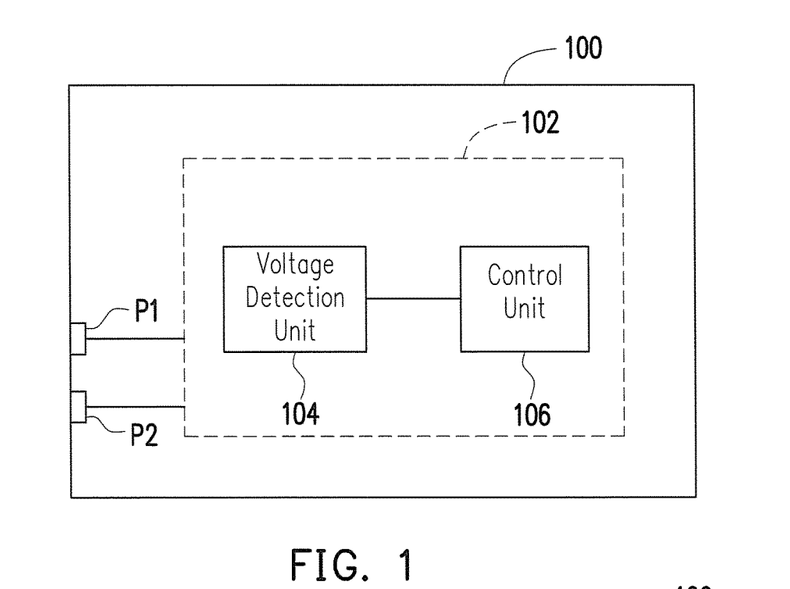
FIG. 1 is a schematic diagram illustrating a projection apparatus according to an embodiment of the invention.

FIG. 1 is a schematic diagram illustrating a projection apparatus according to an embodiment of the invention. Referring to FIG. 1, a projection apparatus 100 of the embodiment includes a first power socket P1, a second power socket P2 and a power management apparatus 102. The power management apparatus 102 is coupled with the first power socket P1 and the second power socket P2. In more detail, the power management apparatus 102 may include a voltage detection unit 104 and a control unit 106, wherein the control unit 106 is coupled to the voltage detection unit 104.

In the embodiment, the first power socket P1 has a first power specification, which may be a low voltage power specification such as 110V; and the second power socket P2 may have a second power specification, which may be a high voltage power specification such as 220V, however the invention is not limited thereto. In the embodiment, the voltage detection unit 104, for example, may be a detection device in a low voltage power supply (LVPS), however the invention is not limited thereto. The voltage detection unit 104 may detect an input voltage, and transmit the detection result to the control unit 106. In the embodiment, the control unit 106, for example, may be a controller or a processor in the low voltage power supply (LVPS), and may include a main circuit board of the projection apparatus 100, however it should not be construed as a limitation to the invention. In the embodiment, the control unit 106 may decide/determine an operation mode of the projection apparatus 100 according to whether the input voltage of the power socket detected by the voltage detection unit 104 is matched up/compatible with the power specifications corresponding to the power socket (for example, determining whether the input voltage of the first power socket P1 is matched up/compatible with a first power specification and/or determining whether the input voltage is matched up/compatible with a second power specification) and decide/determine whether the projection apparatus 100 provides an alarm message. That is to say, in the embodiment, the operation mode of the projection apparatus 100 may be determined through the voltage detection unit 104 detecting the input voltage received by the powered power socket (the power socket which receives power) (namely through the voltage detection unit 104 detecting the input voltage received by the first power socket P1 and/or the second power socket P2), and through the control unit 106 determining whether the received input voltage is matched up/compatible with the power specification of the corresponding powered power socket (the corresponding power socket which receives power). In this way, the projection apparatus 100 of the embodiment of the invention is adapted for voltages of different specifications, which may increase the convenience of use of the projection apparatus and reduce mistakes in material arrangements to ensure safety when using the projection apparatus.

Figure 2:
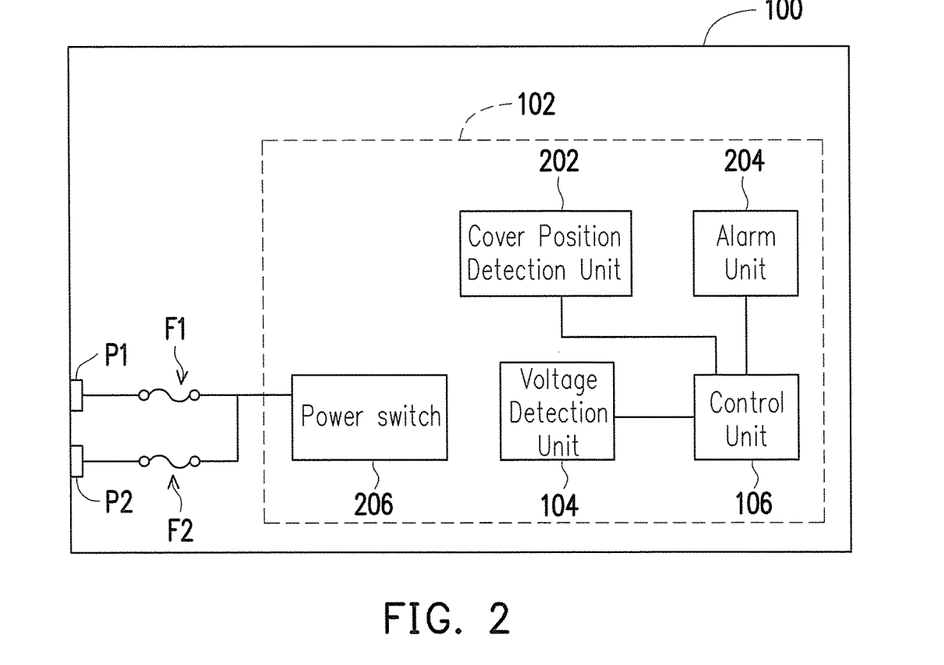
FIG. 2 is a schematic diagram illustrating a projection apparatus according to another embodiment of the invention.

FIG. 2 is a schematic diagram illustrating a projection apparatus according to another embodiment of the invention. Referring to FIG. 2, in the embodiment, the power management apparatus 102 further includes a cover (detailed later), a cover position detection unit 202, an alarm unit 204 and a power switch 206. In the embodiment, the alarm unit 204 and the cover position detection unit 202 which is configured for detecting the position of the cover are coupled to the control unit 106. The first power socket P1 and the second power socket P2 are coupled to the power switch 206 through a first fuse F1 and a second fuse F2 respectively. In the embodiment, the power switch 206 may control whether the input voltage from the first power socket P1 and the second power socket P2 enter the power management apparatus 102. In the embodiment, when the power switch 206 is turned off, the input voltage form the first power socket P1 and the second power socket P2 may be provided to the circuit in the power management apparatus 102, however it should not be construed as a limitation to the invention. In other embodiments, whether the input voltage enters the power management apparatus 102 may be controlled through the first fuse F1 which is coupled between the first power socket P1 and a power switch, and the second fuse F2 which is coupled between the second power socket P2 and another power switch. Namely, whether the two input voltages from the first power socket P1 and the second power socket P2 enter the power management apparatus 102 may be controlled through the two power switches respectively, however the invention is not limited thereto.

More specifically, if the control unit 106 determines the input voltage detected by the voltage detection unit 104 is not matched up/compatible with the power specification of the corresponding powered power socket (the corresponding power socket which receives power), then the control unit 106 may control the projection apparatus 100 to enter a warning mode and control the alarm unit 204 to emit an alarm message during warning mode to notify a user that the input voltage received by the powered power socket (the power socket which receives power) is not matched up/compatible with the power specifications of the powered power socket (the power socket which receives power). For example, when the control unit 106 determines an input voltage received by the first power socket P1 is corresponding to the second power specification, the control unit 106 may control the projection apparatus 100 to enter a first warning mode, and control the alarm unit 204 to emit the alarm message such that the user is notified an input voltage received by the first power socket P1 belongs to the second power specification. Similarly, when the control unit 106 determines an input voltage received by the second power socket P2 is corresponding to the first power specification, the control unit 106 may control the projection apparatus 100 to enter a second warning mode, and control the alarm unit 204 to emit the alarm message such that the user is notified an input voltage received by the second power socket P2 belongs to the first power specification.

In the embodiment, the voltage corresponding to the first power specification is smaller than the voltage corresponding to the second power specification. More specifically, in the embodiment, the voltage corresponding to the first power specification may be a voltage of 110V and the voltage corresponding to the second voltage specification may be a voltage of 220V. The projection apparatus 100 may adopt a high power or a low power operation method during the second warning mode. For example, in an embodiment, when the first power socket P1 receives a voltage of the second power specification, the projection apparatus 100 enters the first warning mode and operates at high power. In another embodiment, when the first power socket P1 receives a voltage of the second power specification, the projection apparatus 100 enters the first warning mode and operates at low power. In some embodiments, when the second power socket P2 receives a voltage of the first power specification the projection apparatus enters the second warning mode and operates at high power. That is to say, even if the powered power socket (the power socket which receives power) receiving an input voltage which is not matched up with (incompatible with) the power specification thereof, the projecting operation may still be performed.

More simply, in some other embodiments, when the first power socket P1 of the first power specification corresponding to the small voltage receives a voltage of the second power specification corresponding to the large voltage, the projection apparatus 100 may adopt the high power operation method with high efficiency or adopt a low power operation method with reduced power consumption. In some embodiments, when the second power socket P2 of the second power specification corresponding to the large voltage receives a voltage of the first power specification corresponding to the small voltage, the projection apparatus 100 may adopt the low power operation method with reduced power consumption or adopt the high power operation method with high efficiency.

In addition, in the embodiment, the first fuse F1 may withstand a voltage corresponding to the first power specification or a voltage corresponding to the second power specification. The second fuse F2 may withstand a voltage corresponding to the first power specification or a voltage corresponding to the second power specification. The first fuse F1 and the second fuse F2 are used to prevent a voltage surge occurring in the input voltages of the first power socket P1 and the second power socket P2, such that damage to the circuit in the projection apparatus 100 may be prevented.

In addition, if the control unit 106 determines the input voltage detected by the voltage detection unit 104 is matched up/compatible with the power specification of the corresponding powered power socket (the corresponding power socket which receives power), then the control unit 106 may control the projection apparatus 100 to enter a normal operation mode. For example, when the control unit 106 determines that an input voltage received by the first power socket P1 is corresponding to the first power specification, the control unit 106 may control the projection apparatus 100 to enter a low power mode, such that the projection apparatus 100 may perform projection at a low power operating method. Similarly, when the control unit 106 determines that an input voltage received by the second power socket P2 is corresponding to the second power specification, the control unit 106 may control the projection apparatus 100 to enter a high power mode, such that the projection apparatus 100 may perform projection at a high power operating method.

Figure 3:
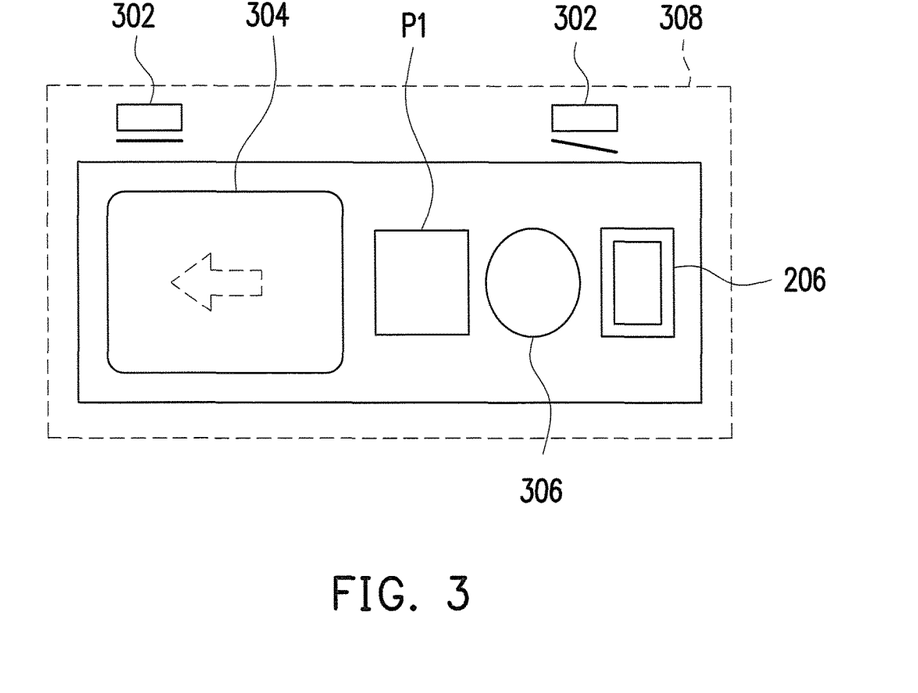
FIG. 3 and FIG. 4 are schematic diagrams illustrating a power socket interface of a projection apparatus according to two embodiments of the invention.
Figure 4:
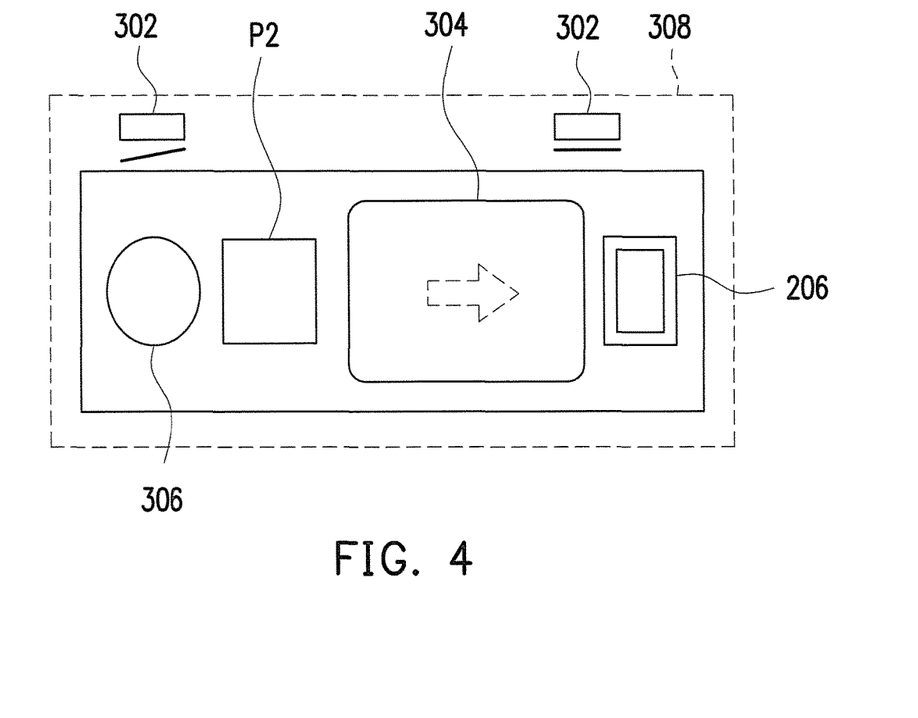

FIG. 3 and FIG. 4 are schematic diagrams illustrating a power socket interface of a projection apparatus according to two embodiments of the invention. Referring to FIG. 3 and FIG. 4, more specifically, in the embodiment, the projection apparatus 100 may further include a casing 308, a cover 304, a cover position detection unit 302, a first fuse repair hole 306 (namely the fuse repair hole 306 on the right side of FIG. 3) and a second fuse repair hole 306 (namely the fuse repair hole 306 on the left side of FIG. 4). In the embodiment, the first power socket P1, the second power socket P2 and the power switch 206 are disposed on the casing 308. The power switch 206 is coupled to the first power socket P1 and the second power socket P2. In the embodiment, the power switch 206 may be used to turn on or turn off a power supply path between the first power socket P1 and the power management apparatus 102, and may be used to turn on or turn off a power supply path between the second power socket P2 and the power management apparatus 102. In the embodiment, the cover 304 is movably disposed (for example, slidably, however the invention is not limited thereto) on the casing 308, such that the first power socket P1 and the first fuse repair hole 306 (namely the fuse repair hole 306 on the right side of FIG. 3)

may be selectively covered simultaneously, or the second power socket P2 and the second fuse repair hole 306 (namely the fuse repair hole 306 on the left side of FIG. 4) may be selectively covered simultaneously. In the embodiment, the first fuse repair hole 306 (namely the fuse repair hole 306 on the right side of FIG. 3) and the second fuse repair hole 306 (namely the fuse repair hole 306 on the left side of FIG. 4) are disposed on the casing 308. More specifically, when the first fuse F1 (as shown in FIG. 2) and the second fuse F2 (as shown in FIG. 2) are disposed in the first fuse repair hole 306 (namely the fuse repair hole 306 on the right side of FIG. 3) and the second fuse repair hole 306 (namely the fuse repair hole 306 on the left side of FIG. 4) respectively, the user may perform an exchange of the fuses conveniently through the embodiment of FIG. 3 by sliding the cover 304 to a position covering the second power socket P2 (as shown in FIG. 4) and the second fuse repair hole 306 (namely the fuse repair hole 306 on the left side of FIG. 4) such that the first fuse F1 is exposed, or through the embodiment of FIG. 4 by sliding the cover 304 to a position covering the first power socket P1 (as shown in FIG. 3) and the first fuse repair hole 306 (namely the fuse repair hole 306 on the right side of FIG. 3) such that the second fuse F2 is exposed. In addition, in the embodiment, the cover position detection unit 302 is coupled to the control unit 106 and the cover position detection unit 302 may detect the position of the cover 304 which is disposed on the casing 308, and send a position detection signal to the control unit 106.

For example, in the embodiment, the cover position detection unit 302 may be a limit switch, however the invention is not limited thereto. In other embodiments, for example, other methods may be used for implementing, such as a micro switch (micro switch, inching switch or jiggle), an infrared detector or a distance detector. In the embodiment, the cover position detection unit 302 is disposed at the right and left two sides of the casing, as shown in FIG. 3. When the cover 304 is moved to a position covering the second power socket P2 and the second fuse repair hole 306 (namely the fuse repair hole 306 on the left side of FIG. 4), the corresponding limit switch (namely the cover position detection unit 302 on the left side) is contacted, whereby a corresponding position detection signal is sent to the control unit 106. Similarly, in the embodiment, as shown in FIG. 4, when the cover 304 is moved to a position covering the first power socket P1 and the first fuse repair hole 306 (namely the fuse repair hole 306 on the right side of FIG. 3), the corresponding limit switch (namely the cover position detection unit 302 on the right side) is contacted, whereby a corresponding position detection signal is sent to the control unit 106. In this way, the control unit 106 may determine if the cover is covering the first power socket P1 or the second power socket P2 according to the position detection signal. As in the embodiment, if the position detection signal is from the limit switch on the left side (namely the cover position detection unit 302 at the left side), then it represents the second power socket P2 and the second fuse repair hole 306 (namely the fuse repair hole 306 on the left side of FIG. 4) is covered. On the other hand, if the position detection signal is from the limit switch on the right side (namely the cover position detection unit 302 at the right side), then it represents the first power socket P1 and the first fuse repair hole 306 (namely the fuse repair hole 306 on the right side of FIG. 3) is covered. Therefore, the control unit 106 may determine whether the input voltages received by the first power socket P1 or the second power socket P2 are matched up/compatible with their corresponding power specifications according to the input voltages detected by the position detection signal and the voltage detection unit 104. In this way, the usage situation of the first power socket P1 or the second power socket P2 may be determined, and a situation where the wrong power is plugged-in in error may be prevented such that the safety of using the projection apparatus is effectively increased.

In addition, the cover 304 may cover the second power socket P2 and the second fuse repair hole 306 (namely the fuse repair hole 306 on the left side of FIG. 4) simultaneously, or cover the first power socket P1 and the first fuse repair hole 306 (namely the fuse repair hole 306 on the right side of FIG. 3) simultaneously, therefore the user may also determine the power specifications corresponding to the first fuse repair hole 306 (namely the fuse repair hole 306 on the right side of FIG. 3) and the second fuse repair hole 306 (namely the fuse repair hole 306 on the left side of FIG. 4) directly through a region which the cover 304 covers, such that changing out the first fuse F1 and the second fuse F2 is more convenient. It should be noted, the cover 304 of the embodiment may be used to cover the second power socket P2 and the second fuse repair hole 306 (namely the fuse repair hole 306 on the left side of FIG. 4) simultaneously, or may be used to cover the first power socket P1 and the first fuse repair hole 306 (namely the fuse repair hole 306 on the right side of FIG. 3) simultaneously. However, in some embodiments, the cover 304 may also be designed to only cover the first power socket P1. In other embodiments, the cover 304 may also be designed to cover only the second power socket P2. In addition, the cover position detection unit 302 may also be disposed on the left side or the right side only, namely adopting only one cover position detection unit 302 for detecting the position of the cover 304 to determine the region covered by the cover 304 through whether the cover position detection unit 302 sends the position detection signal.

Figure 5:
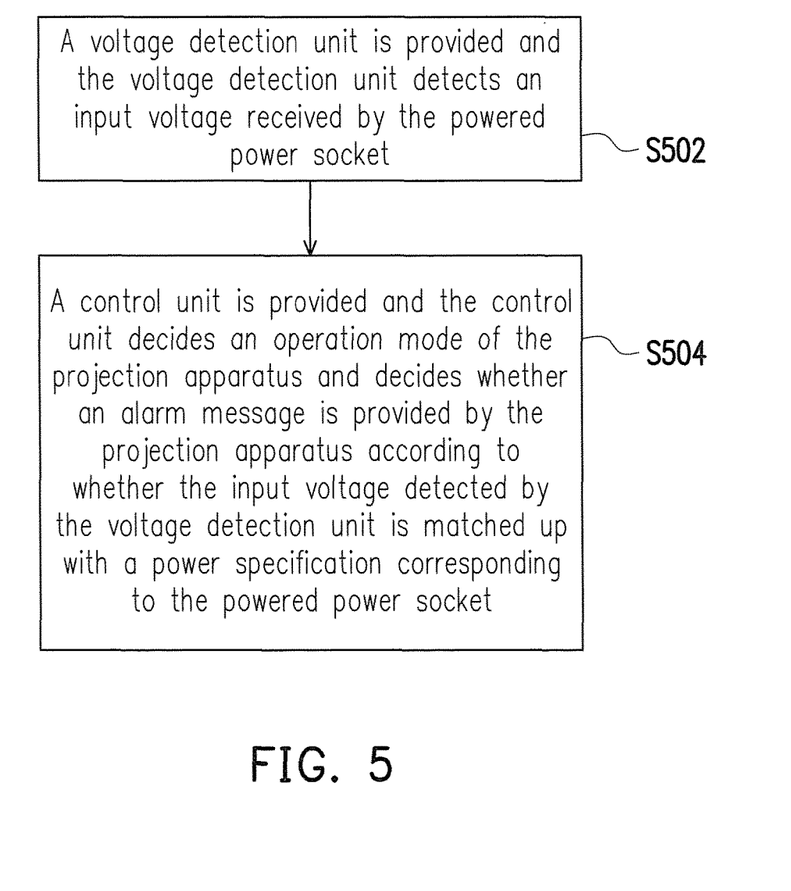
FIG. 5 is a schematic flow diagram illustrating a method for power management of a power management apparatus according to an embodiment of the invention.

FIG. 5 is a schematic flow diagram illustrating a method for power management of a power management apparatus according to an embodiment of the invention. Referring to FIG. 5, as may be seen from the aforementioned embodiments, the method for power management of a power management apparatus may include the following steps. First, a voltage detection unit is provided and the voltage detection unit detects an input voltage received by powered power socket (the power socket which receives power) (step S502), wherein the powered power socket (the power socket which receives power) is the aforementioned first power socket or the aforementioned second power socket. Next, a control unit is provided and the control unit decides/determines the operation mode of the projection apparatus and decides/determines whether an alarm message is provided by the projection apparatus according to whether the input voltage detected by the voltage detection unit is matched up/compatible with the power specification corresponding to the powered power socket (the power socket which receives power), (step S504).

Figure 6A:
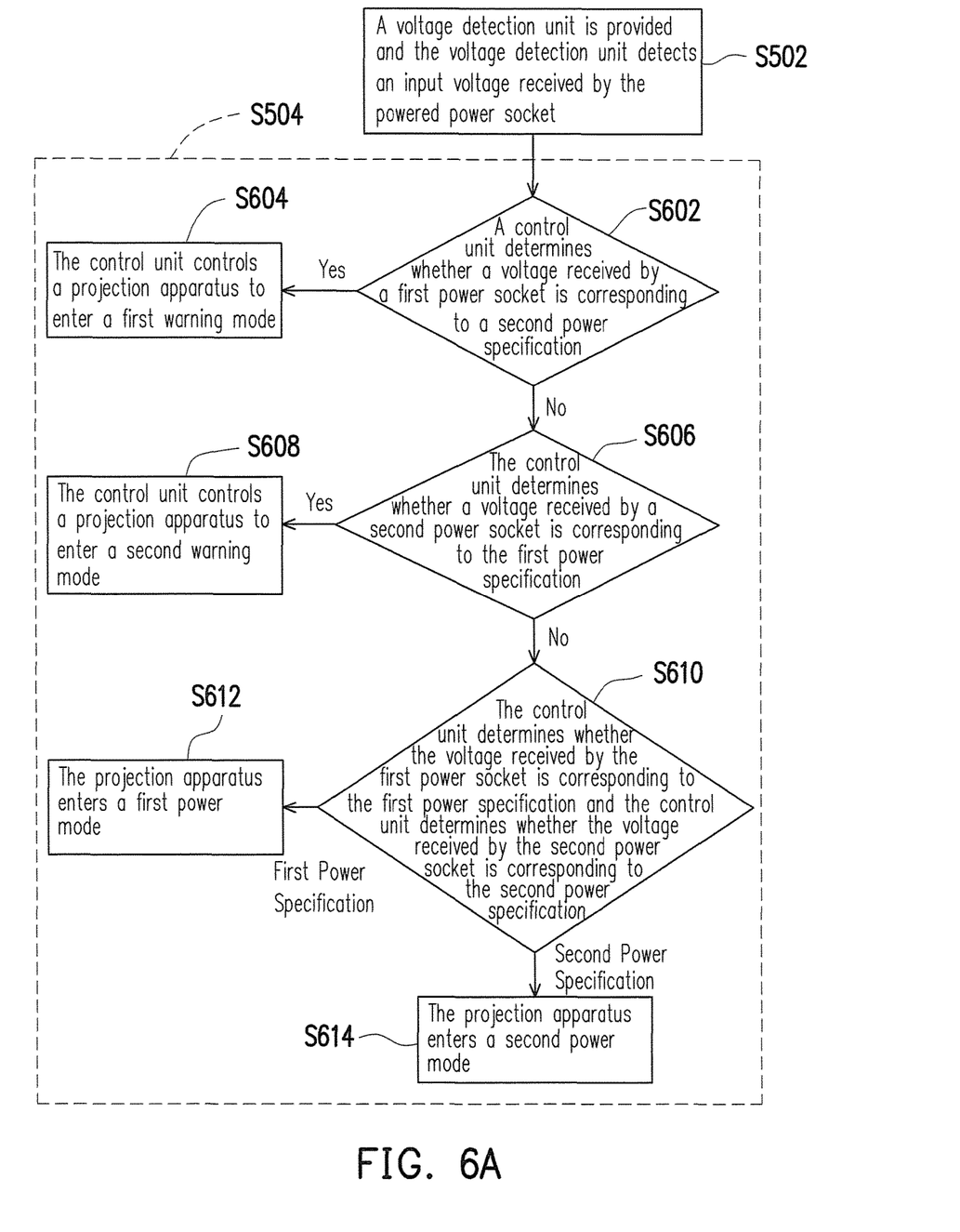
FIGS. 6A-6E are schematic flow diagrams illustrating methods for power management of a power management apparatus according to other embodiments of the invention.
Figure 6B:
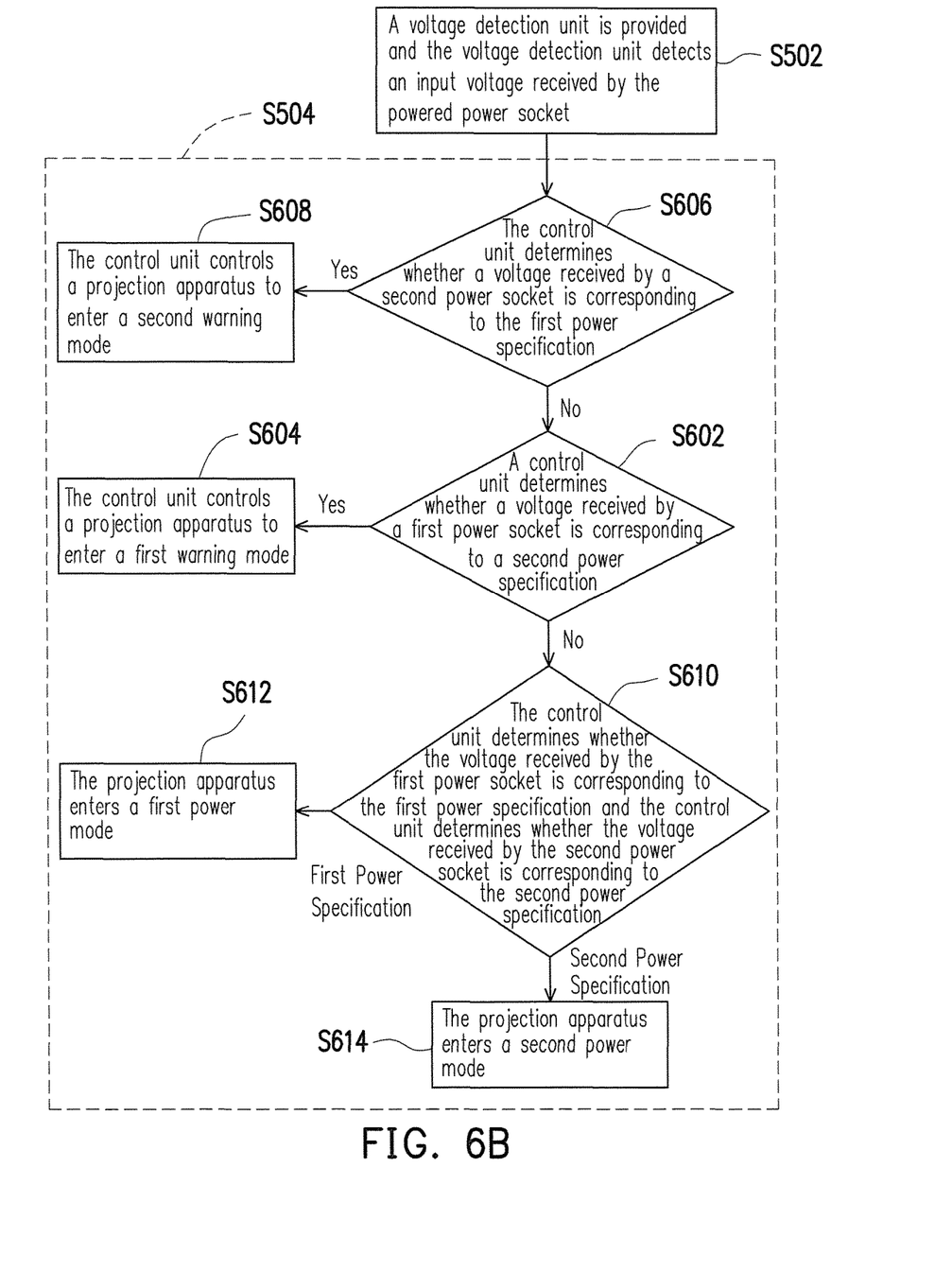

More specifically, the step S504 of FIG. 5 may, for example, include steps such as S602, S604, S606, S608, S610, S612, S614 in FIG. 6A. FIGS. 6A-6E are schematic flow diagrams illustrating methods for power management of a power management apparatus according to other embodiments of the invention. Referring to FIG. 6A, first, a control unit determines whether a voltage received by a first power socket is corresponding to a second power specification (S602). If the voltage received by the first power socket is corresponding to the second power specification, then the control unit controls a projection apparatus to enter a first warning mode (Step S604). At this time, an alarm unit may send an alarm message to cue a user of the projection apparatus that the input voltage received by the first power socket is not matched up/compatible with the power specification corresponding to the first power socket, namely the user may be notified that the input voltage received by the first power socket belongs to the second power specification. On the contrary, if the first power socket does not receive a voltage corresponding to the second power specification, then the control unit determines whether the voltage received by the second power socket is corresponding to the first power specification (step S606). If the voltage received by the second power socket is corresponding to the first power specification, then the control unit controls a projection apparatus to enter a second warning mode (Step S608). At this time, an alarm unit may send an alarm message to cue a user of the projection apparatus that the input voltage received by the second power socket is not matched up/compatible with the power specification corresponding to the second power socket, namely the user may be notified that the input voltage received by the second power socket belongs to the first power specification. In the embodiment, the voltage corresponding to the first power specification may, for example, be smaller than the voltage corresponding to the second power specification. In this way, the projection apparatus may adopt a high power or a low power operation method during the first warning mode, and may also adopt a low power or a high power operation method during the second warning mode.

If the second power socket does not receive a voltage corresponding to the first power specification, then the control unit continues to determine whether the voltage received by the power socket is corresponding to the power specification thereof. Namely, the control unit determines whether the voltage received by the first power socket is corresponding to the first power specification and the control unit determines whether the voltage received by the second power socket is corresponding to the second power specification (step S610). In the embodiment, if the first power socket receives a voltage corresponding to the first power specification, then the projection apparatus enters a first power mode (step S612), and if the second power socket receives the voltage corresponding to the second power specification, then the projection apparatus enters a second power mode (step S614). In the embodiment, if the voltage corresponding to the first power specification is smaller than the voltage corresponding to the second power specification, then the projection apparatus may operate at the low power operation method during the first power mode, and the projection apparatus may operate at the high power operation method during the second power mode, however it should not be construed as a limitation to the invention.

The determination sequence of the aforementioned steps S602, S606 and S610 is not limited to the embodiment shown in FIG. 6A. In other embodiments, a sequence of the execution steps may be changed to S602, S606 and S610. For example, FIGS. 6B-6E are schematic flow diagrams illustrating methods for power management of a power management apparatus according to some other embodiments of the invention. A major difference between the embodiment of FIG. 6B and the embodiment of FIG. 6A lies in: in FIG. 6B, the step S606 is executed firstly, and if it is determined in step S606 that the second power socket does not receive the voltage corresponding to the first power specification, then step S602 is entered. If it is determined in step S602 that the first power socket does not receive the voltage corresponding to the second power specification, then step S610 is entered.

Figure 6C:
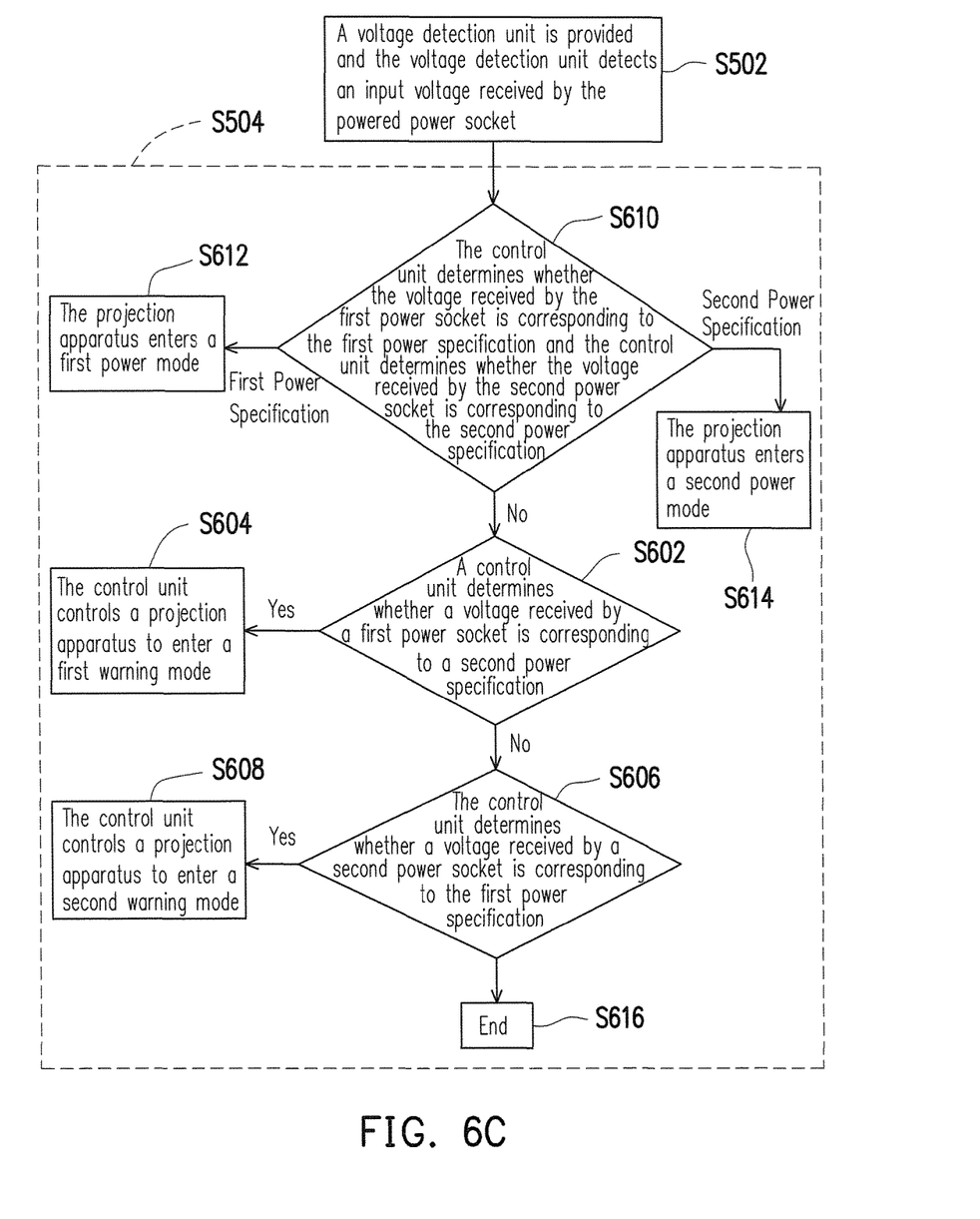

In addition, a major difference between the embodiment of FIG. 6C and the embodiment of FIG. 6A lies in: in FIG. 6C, the step S610 is executed firstly, and if it is determined in step S610 that it is all no, namely the first power socket does not receive the voltage corresponding to the first power specification and the second power socket also does not receive the voltage corresponding to the second power specification, then at this time step S602 is entered to execute the step of determining whether the first power socket receives the voltage corresponding to the second power specification. If it is determined in step S602 that the first power socket does not receive the voltage corresponding to the second power specification, then step S606 is entered. If it is determined in step S606 that the second power socket does not receive the voltage corresponding to the first power specification, then the steps of the method for power management of a power management apparatus are ended (step S616).

Figure 6D:
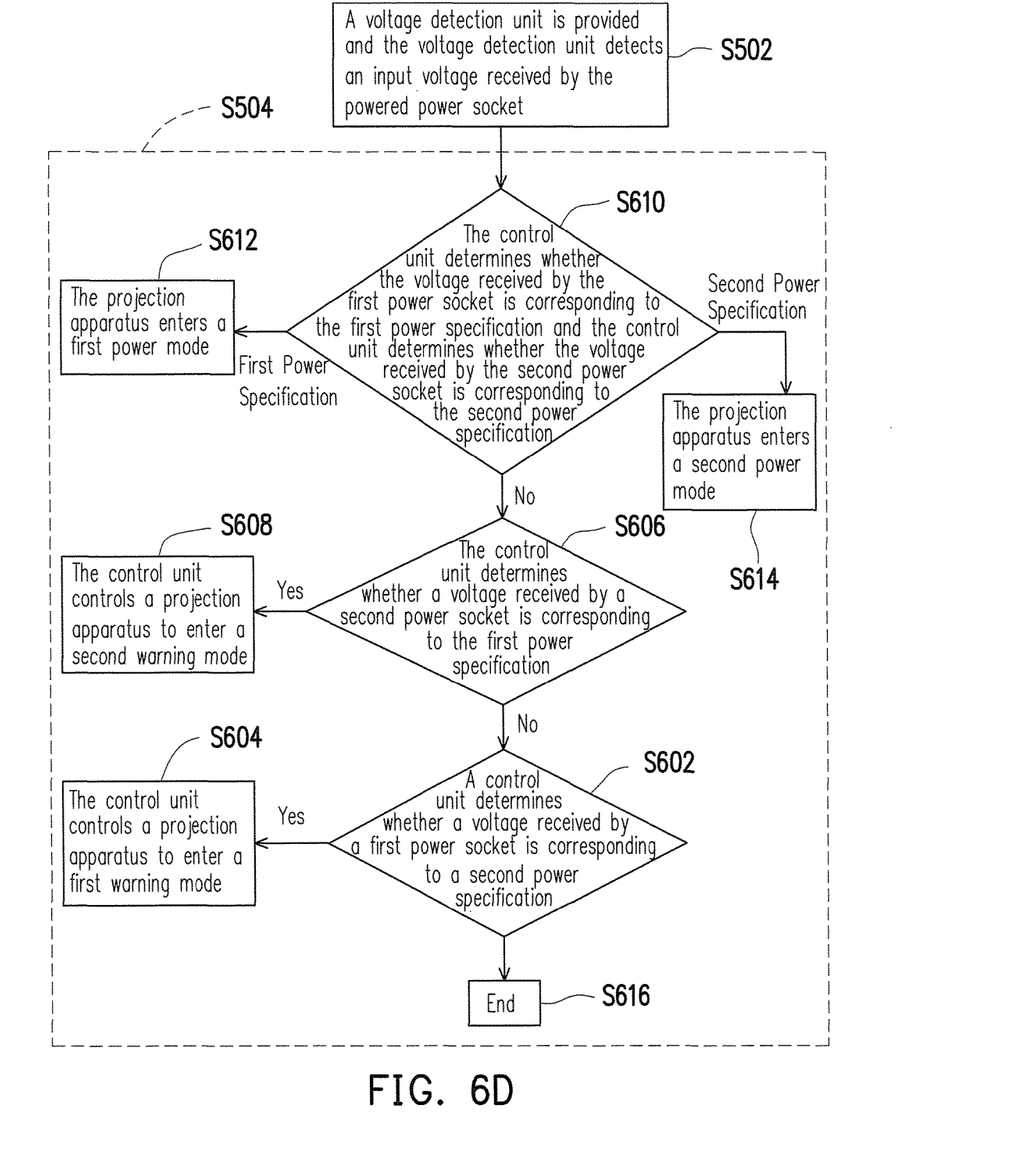

In addition, a major difference between the embodiment of FIG. 6D and the embodiment of FIG. 6C lies in: in FIG. 6D, under the case if it is determined in step S610 that it is all no, then the step S606 is executed firstly. If it is determined in step S606 that the second power socket does not receive the voltage corresponding to the first power specification, then step S602 is entered. If it is determined in step S602 that the first power socket does not receive the voltage corresponding to the second power specification, then the steps of the method for power management of a power management apparatus are ended (step S616).

Figure 6E:
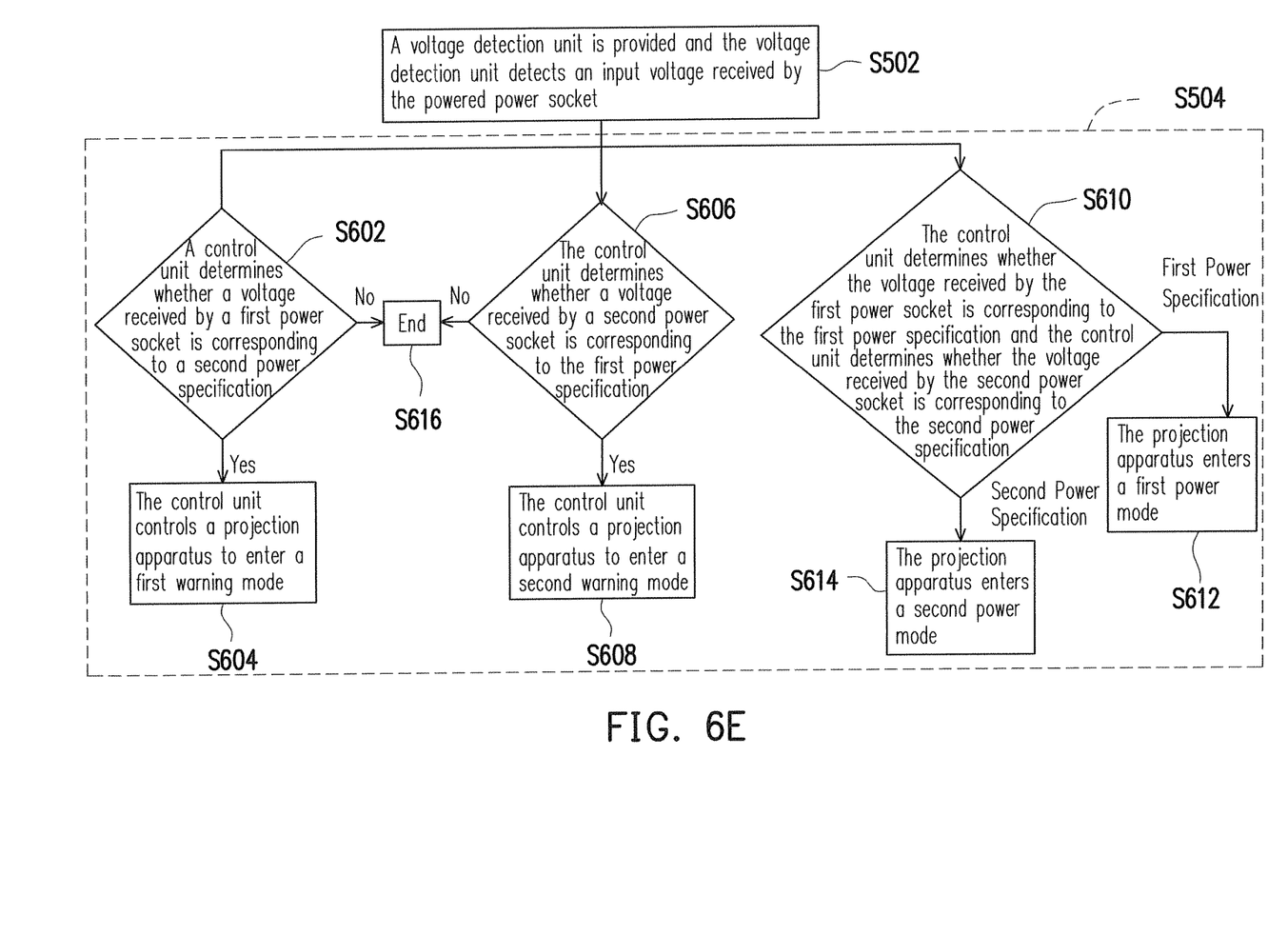

On the other hand, in the embodiment of FIG. 6E, after the step S502, the steps S602, S606 and S610 are executed at the same time. If it is determined in step S602 that it is no, namely it is determined that the second power socket does not receive the voltage corresponding to the first power specification, then step S616 is entered, namely the determination step S602 is ended. If it is determined in step S602 that it is yes, then step S604 is entered. Similarly, if it is determined in step S606 that is no, namely it is determined that the first power socket does not receive the voltage corresponding to the second power specification, then step S616 is entered, namely the determination step S606 is ended. If it is determined in step S606 that it is yes, then step S608 is entered. In addition, in step S610, if the first power socket receives the voltage corresponding to the first power specification, then the projection apparatus enters the first power mode (step S612), and if the second power socket receives the voltage corresponding to the second power specification, then the projection apparatus enters the second power mode (step S614).

Figure 7:
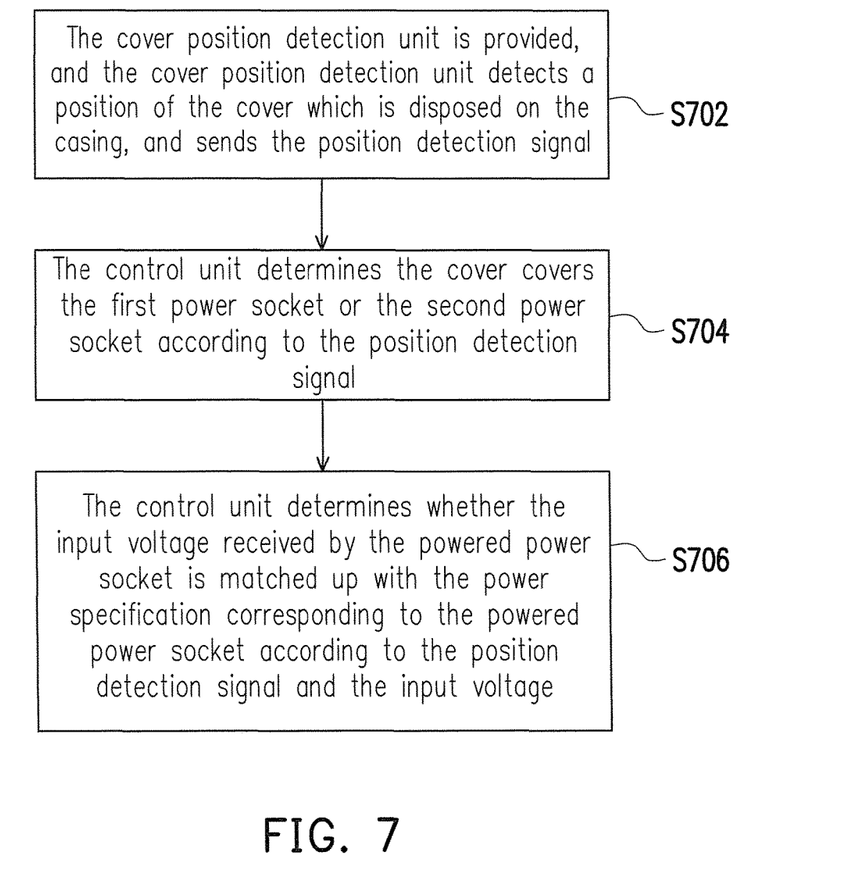
FIG. 7 is a schematic flow diagram illustrating a method for determining whether an input voltage is matched up with the power specifications corresponding to the powered power socket.

FIG. 7 is a schematic flow diagram illustrating a method for determining whether an input voltage is matched up with the power specifications corresponding to the powered power socket. Referring to FIG. 7, more specifically, in the aforementioned step S504, a method for the control unit determining whether the input voltage detected by the voltage detection unit is matched up/compatible with the input voltage corresponding to the power specification may, for example, include the following steps. First, the cover position detection unit is provided, and the cover position detection unit detects a position of the cover which is disposed on the casing, and sends the position detection signal (S702). Next the control unit determines the cover covers the first power socket or the second power socket according to the position detection signal (step S704), wherein the cover is movably disposed on the casing, and configured to selectively cover the first power socket or the second power socket. Then, the control unit determines whether the input voltage received by the powered power socket (the power socket which receives power) is matched up/compatible with the power specification corresponding to the powered power socket (the power socket which receives power) according to the position detection signal and the input voltage (step S706).

In summary, an embodiment of the invention detects input voltages received by different power sockets through a voltage detection unit and determines whether the input voltage is matched up/compatible with the power specification corresponding to the powered power socket (the power socket which receives power) through a control unit to decide an operation mode of a projection apparatus and whether an alarm message is provided by the projection apparatus. In this way, the projection apparatus may use voltages of different specifications, therefore the convenience of using the projection apparatus is increased, mistakes in material arrangements are reduced, whether the power is mistakenly plugged by the user is suitably notified, and the safety of using the projection apparatus is increased. In addition, in some embodiments, a location where a cover is covered may be detected through a cover position detection unit. In addition, whether the input voltage received by the powered power socket is matched up/compatible with the power specification corresponding to the power socket may be determined according to two detection results, namely the input voltage and the location where the cover is covered. In this way, a situation where the wrong power is plugged-in in error may be prevented, and the safety of using the projection apparatus is further increased. Furthermore, in an emergency situation that when the power specifications suitable for the input voltage may not be obtained, the projection apparatus may still be operated at different power modes to satisfy user needs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   a first power socket, corresponding to a first power specification;
   a second power socket, corresponding to a second power specification,
   wherein the second power specification is different from the first power specification; and
   a power management apparatus, coupled to the first power socket and the second power socket, the power management apparatus comprising:
   a voltage detection unit, adapted to detect an input voltage received by a powered power socket, wherein the powered power socket is the first power socket or the second power socket; and
   a control unit, coupled to the voltage detection unit, and deciding an operation mode of the projection apparatus and deciding whether an alarm message is provided by the projection apparatus according to whether the input voltage detected by the voltage detection unit is matched up with a power specification corresponding to the powered power socket.

2. The projection apparatus as claimed in claim 1, wherein the control unit controls the projection apparatus to enter a first warning mode if a voltage received by the first power socket is corresponding to the second power specification, and the control unit controls the projection apparatus to enter a second warning mode if a voltage received by the second power socket is corresponding to the first power specification.

3. The projection apparatus as claimed in claim 2, wherein the power management apparatus further comprises:
   an alarm unit, coupled to the control unit, wherein the control unit controls the alarm unit to send the alarm message if the projection apparatus enters the first warning mode or the second warning mode, wherein the alarm message is configured to notice that the input voltage received by the powered power socket is not matched up with the power specification corresponding to the powered power socket.

4. The projection apparatus as claimed in claim 2, wherein the voltage corresponding to the first power specification is smaller than the voltage corresponding to the second power specification, the projection apparatus operates at a high power or a low power method during the first warning mode, and the projection apparatus operates at the low power or the high power method during the second warning mode.

5. The projection apparatus as claimed in claim 2, wherein the projection apparatus is configured to perform projection during the first warning mode and is configured to perform projection during the second warning mode.

6. The projection apparatus as claimed in claim 1, wherein when the voltage received by the first power socket is corresponding to the first power specification, the control unit controls the projection apparatus to enter a first power mode, and when the voltage received by the second power socket is corresponding to the second power specification, the control unit controls the projection apparatus to enter a second power mode.

7. The projection apparatus as claimed in claim 1, further comprising:
a casing, wherein the first power socket and the second power socket are disposed on the casing; and
a cover, movably disposed on the casing, configured to selectively cover the first power socket or the second power socket.

8. The projection apparatus as claimed in claim 7, further comprising:
a cover position detection unit, coupled to the control unit, and detecting a position of the cover and correspondingly sending a position detection signal, wherein the control unit determines the cover covers the first power socket or the second power socket according to the position detection signal.

9. The projection apparatus as claimed in claim 8, wherein the control unit further determines whether the input voltage received by the powered power socket is matched up with the power specification corresponding to the powered power socket according to the position detection signal and the input voltage.

10. The projection apparatus as claimed in claim 7, wherein the power management apparatus further comprises:
a first fuse repair hole, disposed on the casing, and configured to expose a first fuse corresponding to the first power socket, wherein the first fuse is coupled between the first power socket and the power management apparatus, wherein the cover is further configured to selectively cover the first power socket and the first fuse repair hole at the same time; and
a second fuse repair hole, disposed on the casing, and configured to expose a second fuse corresponding to the second power socket, wherein the second fuse is coupled between the second power socket and the power management apparatus, wherein the cover is further configured to selectively cover the second power socket and the second fuse repair hole at the same time.

11. The projection apparatus as claimed in claim 1, wherein the power management apparatus further comprises:
a power switch, coupled to the first power socket and the second power socket, configured to turn on or turn off a power supply path between the first power socket and the power management apparatus, and configured to turn on or turn off a power supply path between the second power socket and the power management apparatus.

12. A power management apparatus, adapted for managing a projection apparatus, the projection apparatus has a first power socket corresponding to a first power specification and a second power socket corresponding to a second power specification, the second power specification is different from the first power specification, the power management apparatus comprising:
a voltage detection unit, adapted to detect an input voltage received by a powered power socket, wherein the powered power socket is the first power socket or the second power socket; and
a control unit, coupled to the voltage detection unit, and deciding an operation mode of the projection apparatus and deciding whether an alarm message is provided by the projection apparatus according to whether the input voltage detected by the voltage detection unit is matched up with a power specification corresponding to the powered power socket.

13. The power management apparatus as claimed in claim 12, wherein the control unit controls the projection apparatus to enter a first warning mode if a voltage received by the first power socket is corresponding to the second power specification, and the control unit controls the projection apparatus to enter a second warning mode if a voltage received by the second power socket is corresponding to the first power specification.

14. The power management apparatus as claimed in claim 13, further comprising:
an alarm unit, coupled to the control unit, wherein the control unit controls the alarm unit to send the alarm message if the projection apparatus enters the first warning mode or the second warning mode, wherein the alarm message is configured to notice that the input voltage received by the powered power socket is not matched up with the power specification corresponding to the powered power socket.

15. The power management apparatus as claimed in claim 13, wherein the voltage corresponding to the first power specification is smaller than the voltage corresponding to the second power specification, the projection apparatus operates at a high power or a low power method during the first warning mode, and the projection apparatus operates at the low power or the high power method during the second warning mode.

16. The power management apparatus as claimed in claim 12, wherein when the voltage received by the first power socket is corresponding to the first power specification, the control unit controls the projection apparatus to enter a first power mode, and when the voltage received by the second power socket is corresponding to the second power specification, the control unit controls the projection apparatus to enter a second power mode.

17. The power management apparatus as claimed in claim 12, wherein the first power socket and the second power socket are disposed on a casing of the projection apparatus, the power management apparatus further comprises:
a cover position detection unit, coupled to the control unit, detecting a position of a cover disposed on the casing, and correspondingly sending a position detection signal, wherein the control unit determines the cover covers the first power socket or the second power socket according to the position detection signal, wherein the cover is movably disposed on the casing to selectively cover the first power socket or the second power socket.

18. The power management apparatus as claimed in claim 17, wherein the control unit further determines whether the input voltage received by the powered power socket is matched up with the power specification corresponding to the powered power socket according to the position detection signal and the input voltage.

19. The power management apparatus as claimed in claim 17, further comprising:
a first fuse repair hole, disposed on the casing, and configured to expose a first fuse corresponding to the first power socket, wherein the first fuse is coupled between the first power socket and the power management apparatus, wherein the cover is further configured to selectively cover the first power socket and the first fuse repair hole at the same time; and
a second fuse repair hole, disposed on the casing, and configured to expose a second fuse corresponding to the second power socket, wherein the second fuse is coupled between the second power socket and the power management apparatus, wherein the cover is further configured to selectively cover the second power socket and the second fuse repair hole at the same time.

20. The power management apparatus as claimed in claim 12, further comprising:
a power switch, coupled to the first power socket and the second power socket, configured to turn on or turn off a power supply path between the first power socket and the power management apparatus, and configured to turn on or turn off a power supply path between the second power socket and the power management apparatus.

21. A method for power management, adapted for a projection apparatus having a first power socket corresponding to a first power specification and a second power socket corresponding to a second power specification, the second power specification is different from the first power specification, the method for power management comprising:
providing a voltage detection unit, detecting an input voltage received by a powered power socket through the voltage detection unit, wherein the powered power socket is the first power socket or the second power socket; and
providing a control unit, deciding an operation mode of the projection apparatus and deciding whether an alarm message is provided by the projection apparatus according to whether the input voltage detected by the voltage detection unit is matched up with a power specification corresponding to the powered power socket through the control unit.

22. The method for power management as claimed in claim 21, wherein the step of deciding the operation mode of the projection apparatus and deciding whether the alarm message is provided by the projection apparatus according to whether the input voltage detected by the voltage detection unit is matched up with the power specification corresponding to the powered power socket through the control unit comprises:
if the control unit determines a voltage received by the first power socket is corresponding to the second power specification, the control unit controls the projection apparatus to enter a first warning mode; and
if the control unit determines a voltage received by the second power socket is corresponding to the first power specification, the control unit controls the projection apparatus to enter a second warning mode.

23. The method for power management as claimed in claim 22, wherein the step of deciding the operation mode of the projection apparatus and deciding whether the alarm message is provided by the projection apparatus according to whether the input voltage detected by the voltage detection unit is matched up with the power specification corresponding to the powered power socket through the control unit comprises:
providing an alarm unit, when the projection apparatus enters the first warning mode or the second warning mode, the alarm unit sends the alarm message to notice that the input voltage received by the powered power socket is not matched up with the power specification corresponding to the powered power socket.

24. The method for power management as claimed in claim 22, wherein the voltage corresponding to the first power specification is smaller than the voltage corresponding to the second power specification, the projection apparatus operates at a high power or a low power method during the first warning mode, and the projection apparatus operates at the low power or the high power method during the second warning mode.

25. The method for power management as claimed in claim 21, wherein the step of deciding the operation mode of the projection apparatus and deciding whether the alarm message is provided by the projection apparatus according to whether the input voltage detected by the voltage detection unit is matched up with the power specification corresponding to the powered power socket through the control unit comprises:
determining whether a voltage received by the first power socket is corresponding to the first power specification through the control unit, if the voltage received by the first power socket is corresponding to the first power specification, the control unit controls the projection apparatus to enter a first power mode; and
determining whether a voltage received by the second power socket is corresponding to the second power specification through the control unit, if the voltage received by the second power socket is corresponding to the second power specification, the control unit controls the projection apparatus to enter a second power mode.

26. The method for power management as claimed in claim 21, wherein the first power socket and the second power socket are disposed on a casing of the projection apparatus, the method for power management further comprising:
providing a cover position detection unit, detecting a position of a cover disposed on the casing and correspondingly sending a position detection signal through the cover position detection unit; and
determining the cover covers the first power socket or the second power socket according to the position detection signal through the control unit, wherein the cover is movably disposed on the casing to selectively cover the first power socket or the second power socket.

27. The method for power management as claimed in claim 26, further comprising:
determining whether the input voltage received by the powered power socket is matched up with the power specification corresponding to the powered power socket according to the position detection signal and the input voltage through the control unit.

* * * * *